United States Patent
Duan et al.

(10) Patent No.: US 12,359,142 B2
(45) Date of Patent: Jul. 15, 2025

(54) PREPARATION METHOD OF SOLID SELF-LUBRICATING MATERIAL WITH HIGH TEMPERATURE RESISTANCE

(71) Applicant: Wuhan Research Institute of Materials Protection, Wuhan (CN)

(72) Inventors: Haitao Duan, Wuhan (CN); Changxin Wan, Wuhan (CN); Shengpeng Zhan, Wuhan (CN); Dan Jia, Wuhan (CN); Jian Li, Wuhan (CN); Wulin Zhang, Wuhan (CN); Tian Yang, Wuhan (CN); Yinhua Li, Wuhan (CN)

(73) Assignee: WUHAN RESEARCH INSTITUTE OF MATERIALS PROTECTION, Wuhan (CN)

( * ) Notice: Subject to any disclaimer, the term of this patent is extended or adjusted under 35 U.S.C. 154(b) by 285 days.

(21) Appl. No.: 18/079,614

(22) Filed: Dec. 12, 2022

(65) Prior Publication Data

US 2024/0158713 A1    May 16, 2024

(30) Foreign Application Priority Data

Oct. 31, 2022    (CN) .......................... 202211344264.X

(51) Int. Cl.
*C10M 111/04*    (2006.01)
*B29C 43/00*    (2006.01)
(Continued)

(52) U.S. Cl.
CPC ......... *C10M 111/04* (2013.01); *B29C 43/003* (2013.01); *C08G 73/1035* (2013.01);
(Continued)

(58) Field of Classification Search
CPC .................. C10M 169/04; C10M 107/44; C10M 177/00; C10M 111/04; C10M 103/02;
(Continued)

(56) References Cited

U.S. PATENT DOCUMENTS

2018/0273707 A1* 9/2018 Price ...................... B29C 43/003
2020/0276773 A1* 9/2020 Duan ................... B63B 35/4413

FOREIGN PATENT DOCUMENTS

EP            3489284 B1 *  6/2021  ........... B05D 3/0254

* cited by examiner

Primary Examiner — Vishal V Vasisth
(74) Attorney, Agent, or Firm — WPAT, PC

(57) ABSTRACT

This invention provides a preparation method of solid self-lubricating material with high temperature resistance, including steps described as follows: first, mixing polymer matrix resin and nano lubricating filler to compose a uniform raw material powders; then, placing the raw material powders in the cavity of hot-press die; keeping the temperature for 90-120 min at the first prepressing temperature, controlling the hot-pressing pressure under the third pre-loading pressure, and gradually increasing the temperature to the solid-phase molding temperature of the material; gradually reducing the temperature to the first preloading temperature after the solid-phase molding is completed; next, removing the pressure, finally, obtaining the solid self-lubricating material by naturally cooling to normal temperature and demoulding. This invention adjusts the hot-pressing molding temperature according to the drift value of glass transition temperature, in order to avoid the degradation of tribological properties and mechanical properties caused by uneven plasticization and overheating of composite materials during the compression molding process.

12 Claims, 10 Drawing Sheets

(51) Int. Cl.
*C08G 73/10* (2006.01)
*C08K 3/04* (2006.01)
*C10M 103/02* (2006.01)
*C10M 107/44* (2006.01)
*C10M 177/00* (2006.01)
*B29K 79/00* (2006.01)
*B29K 105/16* (2006.01)
*B29K 507/04* (2006.01)
*C10N 50/08* (2006.01)
*C10N 70/00* (2006.01)

(52) U.S. Cl.
CPC ..... *C08G 73/1042* (2013.01); *C08G 73/1071* (2013.01); *C08K 3/042* (2017.05); *C08K 3/046* (2017.05); *C10M 103/02* (2013.01); *C10M 107/44* (2013.01); *C10M 177/00* (2013.01); *B29K 2079/08* (2013.01); *B29K 2105/162* (2013.01); *B29K 2507/04* (2013.01); *C08K 2201/011* (2013.01); *C10M 2201/0413* (2013.01); *C10M 2217/0415* (2013.01); *C10N 2050/08* (2013.01); *C10N 2070/00* (2013.01)

(58) Field of Classification Search
CPC .. C10M 2217/0443; C10M 2201/0413; C10M 2217/0415; C08K 3/046; C08K 3/042; C08K 3/04; C08K 2201/011; B29C 43/003; C08G 73/105; C08G 73/1071; C08G 73/1035; C08G 73/1042; C08L 79/08; B29K 2105/162; B29K 2079/08; B29K 2507/04; C10N 2020/06; C10N 2070/00; C10N 2030/06; C10N 2050/08; C10N 2050/14
See application file for complete search history.

PREPARATION METHOD OF SOLID SELF-LUBRICATING MATERIAL WITH HIGH TEMPERATURE RESISTANCE

TECHNICAL FIELD

This invention belongs to the field of materials, and is related to a self-lubricating material, particularly related to a preparation method of solid self-lubricating material with high temperature resistance.

BACKGROUND

Polyimide has excellent mechanical properties because of its rigid benzene ring structure and strong polar amide bond in its molecular main chain and side chain, especially, polyimide material with high glass transition temperature has a long service time in high temperature environment of 200° C.-280° C. for a long time.

Based on the excellent mechanical properties of polyimide, the composite material prepared with addition of anti-friction and antiwear fillers can has performance of self-lubricating, therefore, such composite material can be widely used in antifriction and antiwear structures such as bearing cages, piston rings, sliding bearings, etc. under heavy-load and high-speed conditions. Common layered structural materials used to improve the tribological properties of polyimide include graphite-based fillers, molybdenum disulfide and tungsten disulfide, soft metal fillers such as silver and copper, and self-lubricating polymer fillers such as polytetrafluoroethylene. These lubricating fillers decrease the friction coefficient and wear rate of the composite materials by using their self-lubrication capacity at the friction interface where the composite materials interacts with the friction member. However, as far as polyimide matrix resin composed of rigid benzene ring and strong polar imide skeleton is concerned, the addition of these macroscopic size fillers inevitably leads to the micro-phase physical isolation between macromolecular chains, weakening the interaction between organic groups, hence reducing the mechanical properties of the composites.

After years of advancement in theoretical analysis and application development, nano-materials have been widely applied in all fields of human life. In the field of solid lubricating materials, it has also received extensive attention. Due to its nano-dimensional size effect, nano-material is especially used as a lubricating filler to be blended with polymer matrix resin to compose a composite material, which not only obtains improved tribological properties, but has upgraded mechanical properties, instead of having them decreased. However, after nano-material is added into polyimide matrix resin, the small size effect of nano-lubricating filler could inevitably lead to the glass transition temperature drift of composites. For example, inorganic filler graphene, after being added into polymer resin material, its two-dimensional nano-scale thin-layer structure is dispersed in the resin matrix, which plays a role of "physical cross-linking" of inorganic micro-phase, limiting the rotation of molecular chain segments, hence increasing the glass transition temperature. However, for inorganic nano-fillers modified by chemical organic, the organic groups on inorganic fillers can easily form strong polar bonds with polymer groups, hence limiting the movement of segments and increasing the glass transition temperature.

Solid-phase molding of polyimide is a preparation method of molded products, which applies high constraint stress to the polymer in a solid-like and non-flowing state with the molding temperature above the glass transition temperature of the polymer and below the theoretical melting point. In solid-like molding, the control of molding temperature parameters is particularly important. If the molding temperature is too low, the thermal energy given by the temperature field is not enough to make the polyimide chain segment fully active, therefore, the mechanical strength of the obtained product is not enough, however, if the molding temperature is too high, over-plasticization could occur, making the product brittle and hard. Poor control of molding process leads to the decline of mechanical properties, which could greatly affect the display of tribological properties.

SUMMARY

In order to overcome the flaws described agove, this invention provides a preparation method of solid self-lubricating material with high temperature resistance. By properly adjusting the solid-like molding temperature, the method can avoid the phenomenon of uneven molding plasticization caused by glass transition temperature drift.

A preparation method of solid self-lubricating material with high temperature resistance, including the preparation steps as follows:
  step 1, mixing polymer matrix resin and nano lubricating filler to compose a uniform raw material powders;
  step 2, placing the raw material powders in the cavity of hot-press die, gradually increasing the temperature of the first preloading temperature under the first preloading pressure;
  step 3, keeping the temperature for 90-120 min at the first prepressing temperature, and at the same time, controlling the hot pressing pressure to the second prepressing pressure;
  step 4, controlling the hot-pressing pressure under the third pre-loading pressure, and gradually increasing the temperature to the solid-phase molding temperature of the material; the solid-phase molding temperature of that material is 15-20° C. higher than the glass transition temperature of the material;
  step 5, carrying out heat preservation for 60-180 min under the molding pressure for solid-phase molding after the hot pressing temperature reaches the solid-phase molding temperature of the material;
  step 6, gradually reducing the temperature to the first preloading temperature after the solid-phase molding is completed, next, removing the pressure, finally, obtaining the solid self-lubricating material by naturally cooling to normal temperature and demoulding.

Further, the molding parameters are as follows:
  in step 1, the first preloading pressure is 8-10 MPa, the first preloading temperature is 240-260° C. and the heating rate is 2-5° C./min;
  in step 2, the second preloading pressure is 13-15 MPa;
  in step 3, the third preloading pressure is 25-35 MPa, and the heating rate is 1-3° C./min;
  In step 4, the molding pressure is 35-45 MPa;
  In step 5, the cooling rate is 1-2° C./min.

Further, in step 1, the weight ratio of the polymer matrix resin to the nano lubricating filler is 100:(1-10) in raw material powders.

Further, in step 1, the polymer matrix resin is a polyimide block copolymers with a glass transition temperature of 300-360° C. and an average particle size of 10 μm.

Further, at least one dimension of the nano lubricating filler is nano-scale, meaning the size is less than 100 nm.

Further, the nano lubricating filler is inorganic nano filler or organic graft modified inorganic nano filler. Organic grafting modification is used to make the filler contains polar groups, hence improveing the interaction force between the filler and polymer matrix resin.

Further, the inorganic nano filler is any one or more of graphene, carbon nanotubes, fullerenes, nano graphene and nano molybdenum disulfide.

Further, after the nano lubricating filler is compounded with polyimide, the glass transition temperature of the composite material drifts by 5-30° C. compared with that of pure polyimide, so it is necessary to adjust the solid-phase molding temperature of the material to be 15-20° C. higher than the glass transition temperature of the material.

Preferable, the polyimide is a polyimide soft and hard segments block copolymer; the block copolymer is prepared by copolymerization of polyimide hard segment I and polyimide soft segment II, the reaction equation is as follows:

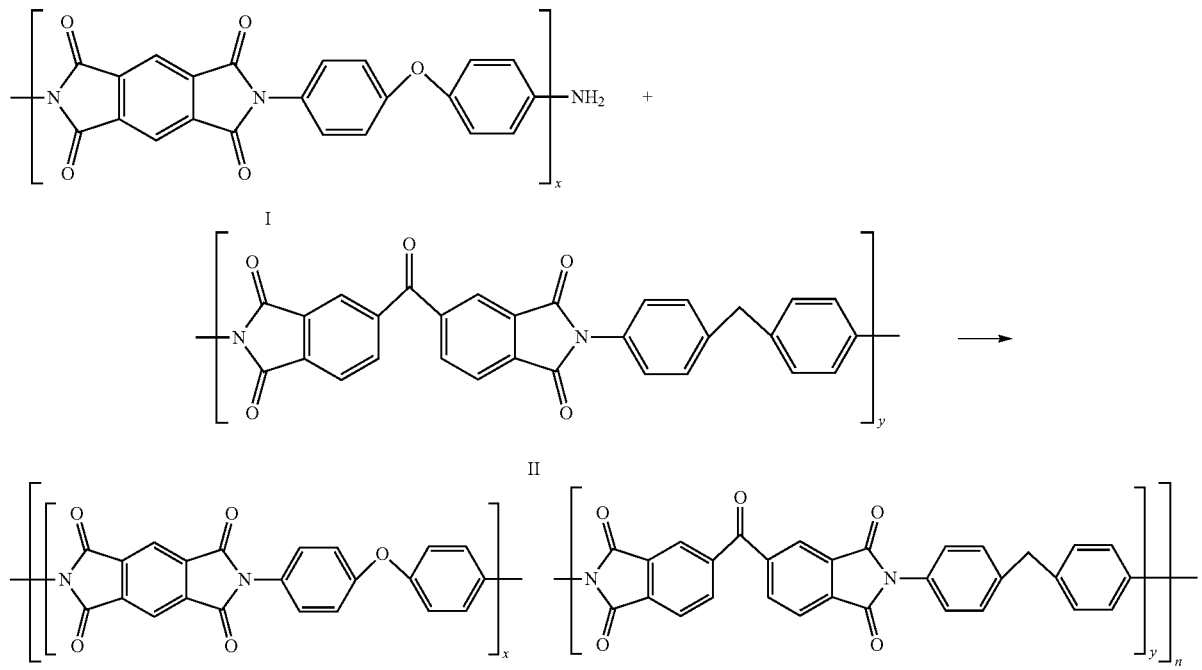

Wherein, x and y are 5-15, n is 1-200.

The polyimide hard segment I is obtained by copolymerization of pyromellitic dianhydride and diaminodiphenyl ether and end-capping with diamine:

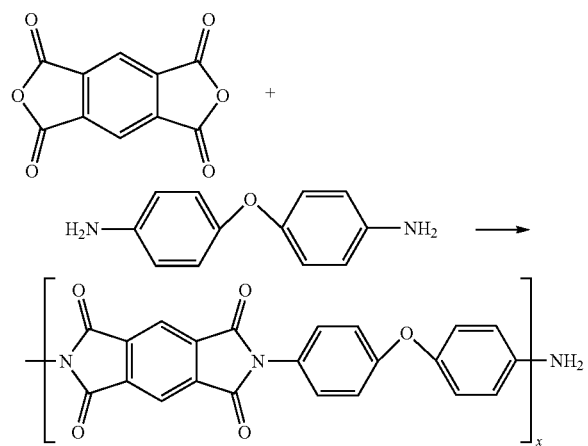

The polyimide soft segment II is obtained by copolymerization of benzophenone tetracarboxylic dianhydride and diphenylmethane diisocyanate and end-capping with dianhydride, the reaction equation is as follows:

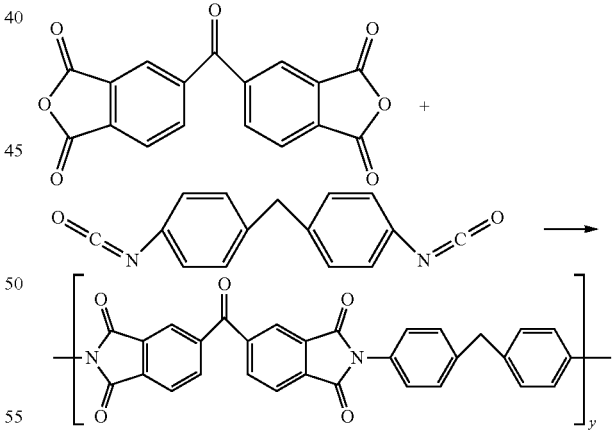

Further, there are two mixing modes of polyimide and nano lubricating filler, described as follows:
- the first mixing mode, introducing nano lubricating filler into the reaction system, after the polyimide block I reacts with the polyimide block II to generate polyamic acid, but before the imidization;
- the second mixing mode, carrying out copolymerization of polyimide hard segment I and polyimide soft segment II to obtain polyimide powder; applying the ultrasonic dispersion-ball milling collaborative mixing process to mix the polyimide powder, nano lubricating filler and solvent; carrying out ultrasonic dispersion at room temperature for 60-120 min; using heating reflux extraction to obtain a blend, using a planetary ball mill to blend the blend for 100-140 min, then drying the blend in an oven at 110-130° C. for 1-3 h to remove the residual volatile matter, finally, obtaining uniformly mixed raw material powder.

Further, the solvent is one or more of ethanol and acetone.

Further, the preparation method of polyimide soft and hard segments block copolymer is described in the steps as follows:

step 1.1, preparation of polyimide soft segment II: placing benzophenone tetracarboxylic dianhydride and N-methylpyrrolidone in a three-necked flask equipped with a stirring and condensing device under the protection of nitrogen atmosphere, and heating the flask until the solid reactants are completely dissolved; next, adding 1,4-diazabicyclo [2.2.2]octane first, then adding diphenylmethane diisocyanate in batches for copolymerization, discharging $CO_2$ generated during the polymerization through a condenser, finally, obtaining BTDA-MDI soft segment copolymer solution end-capping with dianhydride, and cooling it for later use;

step 1.2, preparation of polyimide hard segment I: dissolving diaminodiphenyl ether in N-methylpyrrolidone, controlling the temperature below 18-22° C., and then adding pyromellitic dianhydride in batches to obtain a hard segment copolymer solution of PMDA-ODA end-capping with diamine;

step 1.3, adding the cooled BTDA-MDI soft segment copolymer solution to the PMDA-ODA hard segment copolymer solution at a constant speed, and keeping the reaction temperature below 18-22° C. for block copolymerization to obtain the polyimide soft and hard segments block copolymer.

Further, in step 1.3, after the polyimide soft and hard segments block copolymer is obtained, carrying out spray drying to obtain polyimide block copolymer powder which can be used for hot pressing in cavity of a hot pressing die.

Further, the hot-pressing cavity is designed according to the shape of the product to be prepared.

The glass transition temperature of that polyimide block copolymer is 300-360° C., the addition of nano-lubricating filler could cause the glass transition temperature drift of the composite, which affect its mechanical properties and tribological properties, especially the wear resistance, without changing the molding parameters.

Based on the drift of the glass transition temperature of the composite material, the high-temperature resistant self-lubricating material with excellent comprehensive properties can be obtained by adjusting the solid-like molding temperature.

According to the invention, the molding process is adjusted based on the glass transition temperature drift value, so as to avoid the problems of friction and mechanical property degradation caused by uneven plasticization and overheating of composite materials in the compression molding process.

According to the invention, the nano-composite polyimide, which is used as a solid self-lubricating material with high-temperature tolerance, can provide a long service time in the high-temperature environment of 200-280° C. with good antifriction and antiwear performance. Moreover, if it is used as a nano-composite, it can improve mechanical strength to a certain extent instead of decreasing it.

According to the invention, the nano-composite polyimide is prepared based on both the solid like molding process and the drift of glass transition temperature of the matrix resin caused by the nano filler modified polyimide. By properly adjusting the quasi-solid-phase molding temperature, the invention can avoid the problem of poor plasticization or over-plasticization of the composite material, hence reducing the influence on the tribological performance of the composite material.

DETAILED DESCRIPTION OF EMBODIMENTS

Figure 1:
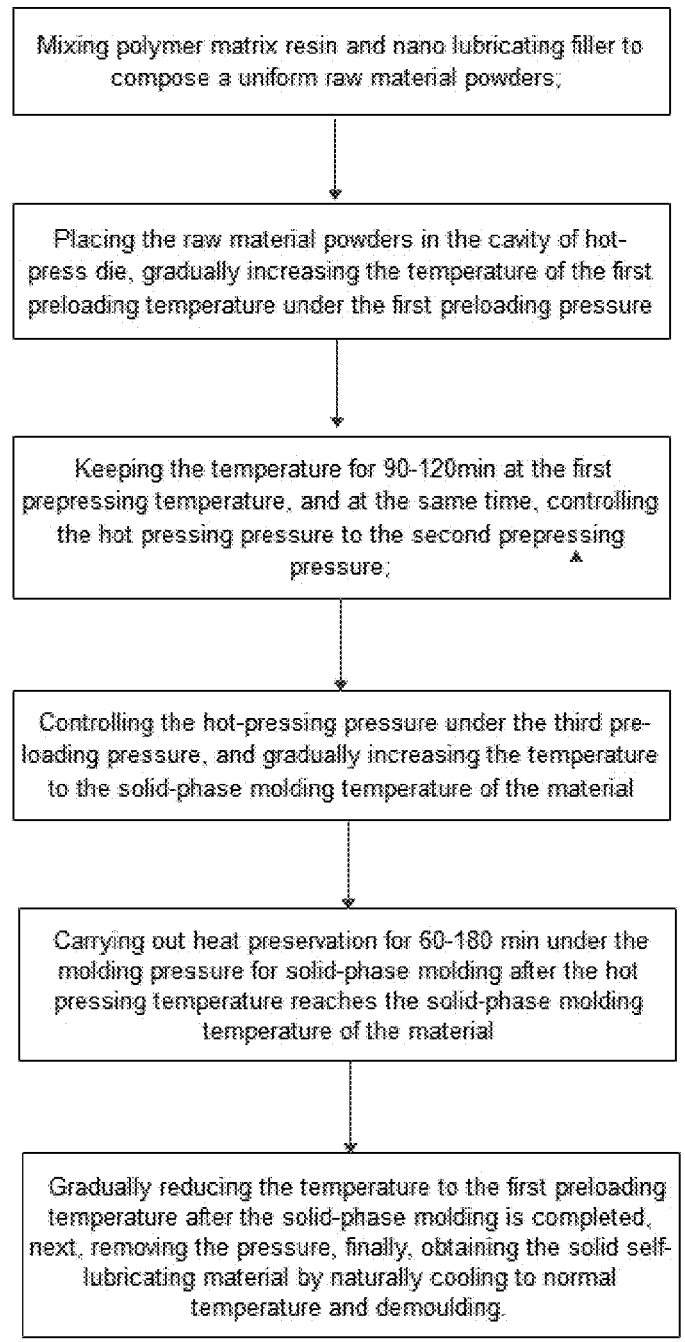
FIG. 1 illustrates a flow chart of the preparation method of the solid self-lubricating material with high temperature resistance.
Figure 2:
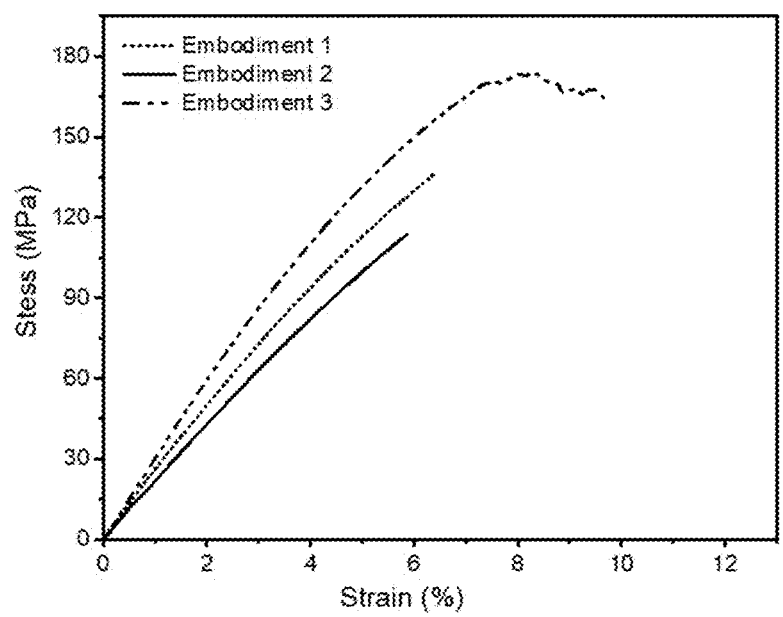
FIG. 2 illustrates a graph of stress and strain of products in embodiment 1-3 of the present invention.
Figure 3:
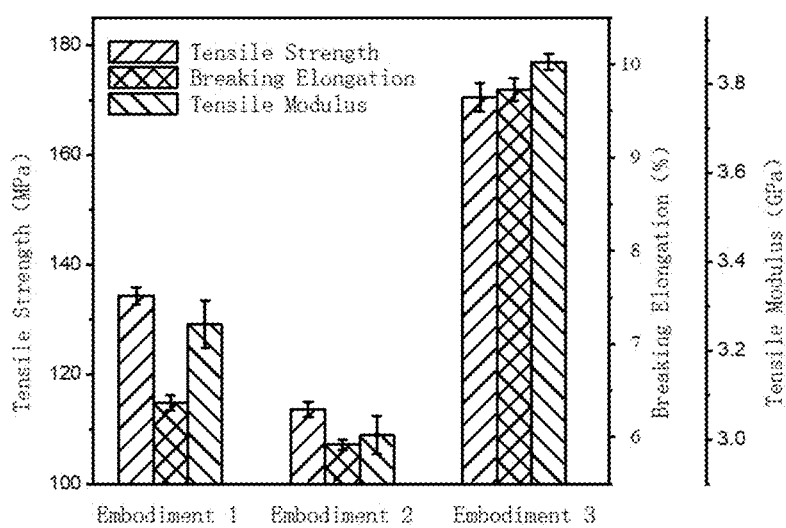
FIG. 3 illustrates a schematic diagram of tensile strength, elastic modulus and elongation at break of products in Embodiment 1-3 of the present invention.
Figure 4:
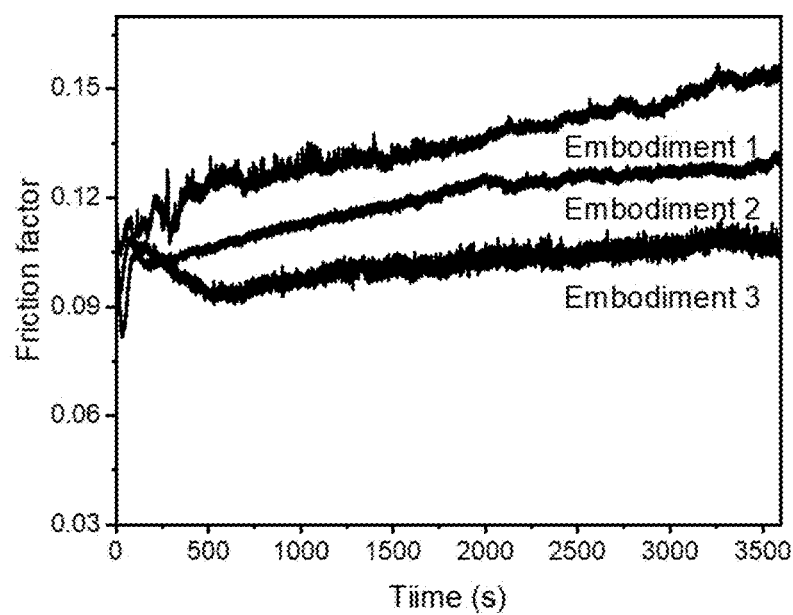
FIG. 4 illustrates a schematic diagram of the friction curve of products in Embodiment 1-3 of the present invention.
Figure 5:
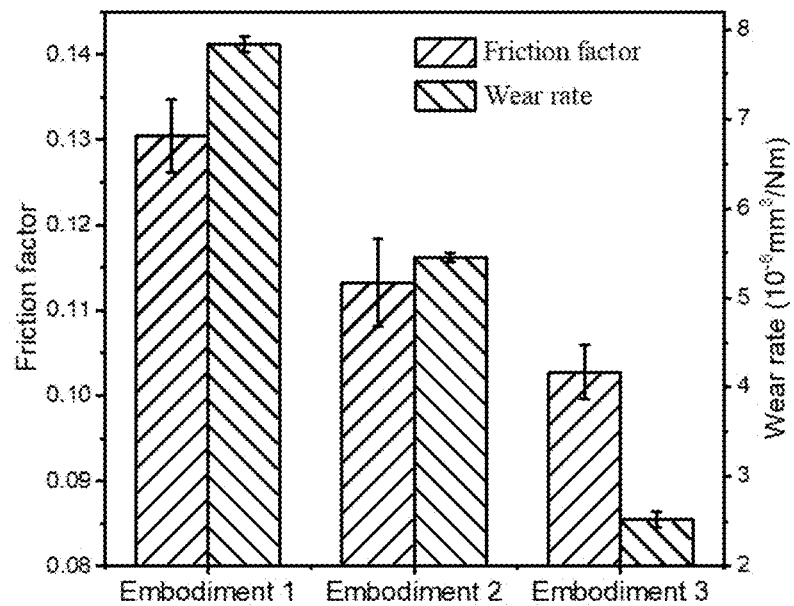
FIG. 5 illustrates a schematic diagram of the average friction coefficient and wear rate of products in Embodiment 1-3 of the present invention.

The embodiment of the present invention will be described in further detail with reference to the following drawings and embodiments. The following embodiments are used to illustrate the invention, but should not be used to limit the scope of the invention.

Embodiment 1

Under the protection of nitrogen atmosphere, 210.06 g (0.65 mol) BTDA and 1000 g NMP were placed in a 5 L three-necked flask equipped with stirring and condensing device. The flask was heated to 80° C. until the solid reactant was completely dissolved, 1 g of TED was added into to flask, then 130.47 g (0.52 mol) MDI was added in batches for copolymerization, $CO_2$ generated during the polymerization was discharged through a condenser, finally, obtained a soft segment copolymer solution of BTDA-MDI end-capping with dianhydride, and the solution was cooled for later use. 113.23 g (0.57 mol) ODA was dissolved in 2000 g NMP, and the temperature was controlled below 20° C. Then, 89.97 g (0.41 mol) PMDA was added in batches to obtain a hard segment copolymer solution of PMDA-ODA end-capping with diamine. The cooled BTDA-MDI soft segment copolymer solution was added to the PMDA-ODA hard segment copolymer solution at a constant speed, and the reaction temperature was kept below 20° C. for block copolymerization to obtain the polyimide soft and hard segment block copolymer. Finally, carried out spray drying to obtain polyimide block copolymer powder with an average particle size of 8-15 μm. The glass transition temperature of the obtained polyimide product was 330° C. measured by differential scanning calorimetry.

The molding was prepared by solid-phase process. The polyimide block copolymer powder without nano-lubricating filler was placed in the mold cavity, and the temperature was raised to 250° C. at the rate of 5° C./min, while the pressure was controlled to 10 MPa; after the temperature raised to 250° C., the temperature was kept for 120 min, and the pressure was controlled to 15 MPa; kept rising the temperature to 350° C. at the rate of 1° C./min, while the pressure was controlled to 30 MPa; when the temperature reached at 350° C., the pressure was controlled to 40 MPa and the heat preservation period was 60 min, after heat preservation, naturally cooled to 250° C., released the pressure, then cooled to normal temperature and demoulded to obtain the polyimide block copolymer material with high temperature resistance.

Embodiment 2 in polyimide solution, 15.23 g carbon nanotubes were added into the reaction system, and then the carbon nanotube modified polyimide composite powder was obtained through subsequent reaction and spray granulation.

The carbon nanotube modified polyimide composite powder was subjected to solid like molding, and the molding process was the same as that in Embodiment 1, and obtained a solid self-lubricating material with high temperature resistance.

The carbon nanotube modified polyimide composite powder was subjected to solid like molding, and the molding process was the same as that in Embodiment 1, and a solid self-lubricating material with high temperature resistance was obtained.

Embodiment 3

Preparation of polyimide block copolymer powder was the same as in Embodiment 1, and obtained carbon nanotube modified polyimide composite powder The carbon nanotube modified polyimide composite powder was subjected to solid-like molding, and the molding process was basically the same as that in Embodiment 1, the difference was that when the material was in solid-like state, the molding temperature changed from 350° C. to 375° C., and a solid self-lubricating material with high temperature resistance was obtained.

Embodiment 4

The polyimide powder, which was obtained in Embodiment 1, and 30 g of polyimide powder, 0.9 g of graphene oxide and acetone were mixed by ultrasonic dispersion-ball milling collaborative mixing process, then the mixture was ultrasonic dispersed at room temperature for 60 min, then acetone was heated and refluxed to obtain a blend, the blend was blended with a planetary ball mill for 120 min, and dried in an oven at 120° C. for 2 hours to remove residual volatile matter, thus obtained graphene oxide-added modified polyimide composite powder.

Graphene oxide and modified polyimide composite powder were added for solid like molding, and the molding process was the same as that in Embodiment 1, and obtained the solid self-lubricating material with high temperature tolerance.

Embodiment 5

The preparation method of polyimide composite powder modified by graphene oxide addition is the same as that of Embodiment 4.

Graphene oxide was added to modified polyimide composite powder for solid-like molding, and the molding process was basically the same as that of Embodiment 4, the difference is that when the material was in solid-like state, the molding temperature was changed from 350° C. to 360° C.

Table 1 shows the key process parameters and material properties of Embodiment 1-5.

|  | Embodiment 1 | Embodiment 2 | Embodiment 3 | Embodiment 4 | Embodiment 5 |
| --- | --- | --- | --- | --- | --- |
| Glass state temperature (° C.) | 330 | 350 | 355 | 337 | 340 |
| Mold temperature (° C.) | 350 | 350 | 375 | 350 | 360 |
| Tensile-strength (MPa) | 134.21 | 113.56 | 170.48 | 124.56 | 168.24 |
| Young's modulus (GPa) | 3.26 | 3.01 | 3.85 | 3.12 | 3.79 |
| Elongation at break (%) | 6.37 | 5.92 | 9.73 | 6.01 | 8.56 |
| Friction factor | 0.1305 | 0.1133 | 0.1028 | 0.23 | 0.18 |
| Wear rate (mm$^3$/Nm) | 7.84 × 10$^{-6}$ | 5.45 × 10$^{-6}$ | 2.52 × 10$^{-6}$ | 7.32 × 10$^{-7}$ | 9.24 × 10$^{-8}$ |

In Table 1, the friction and wear experiment is Rtec ball-on-plate reciprocating friction testing: GCr15 bearing ball pair, the diameter was 6.4 mm, the reciprocating frequency was 8 Hz, reciprocating stroke was 8 mm, experimental time was 90 min and normal pressure was 100N. Embodiment 1, 2 and 3 were subjected to friction experiments in pure water environment, and examples 4 and 5 were subjected to dry friction.

Figure 6:
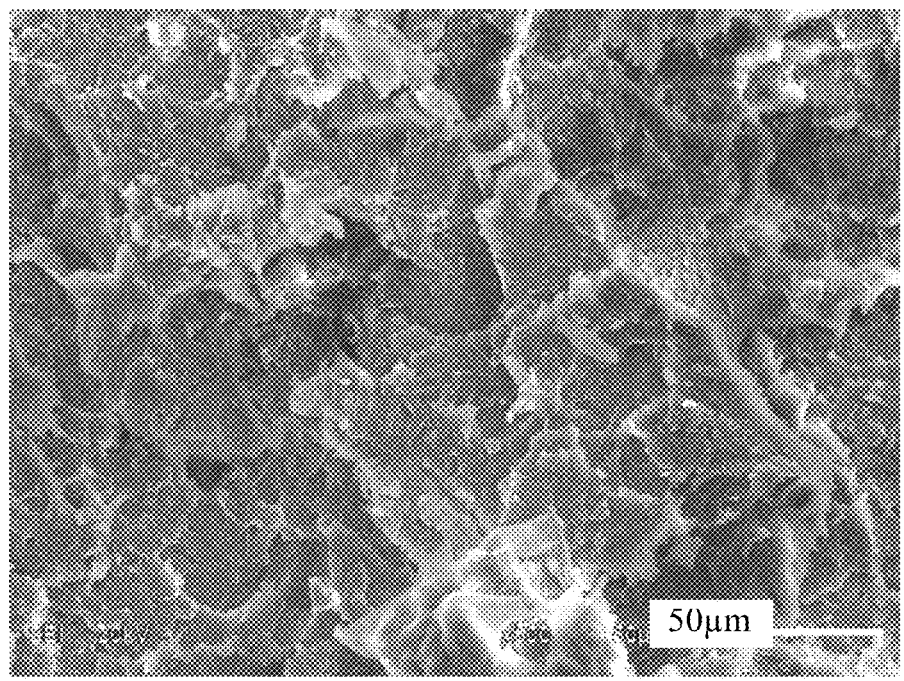
FIG. 6 illustrates a cross-sectional view of macrofracture of polyimide block copolymer material with high temperature resistance in Embodiment 1 of the present invention.
Figure 7:
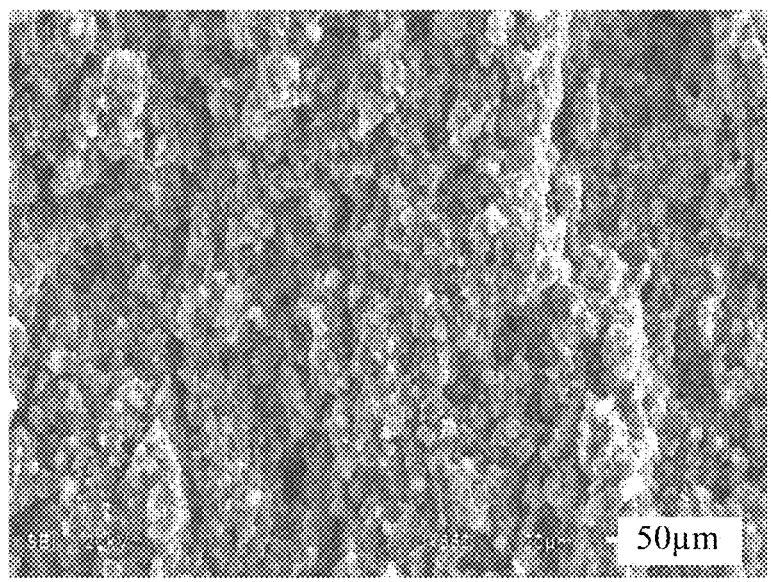
FIG. 7 illustrates a macro-fracture cross-sectional view of the solid self-lubricating material with high temperature resistance in Embodiment 2 of the present invention.
Figure 8:
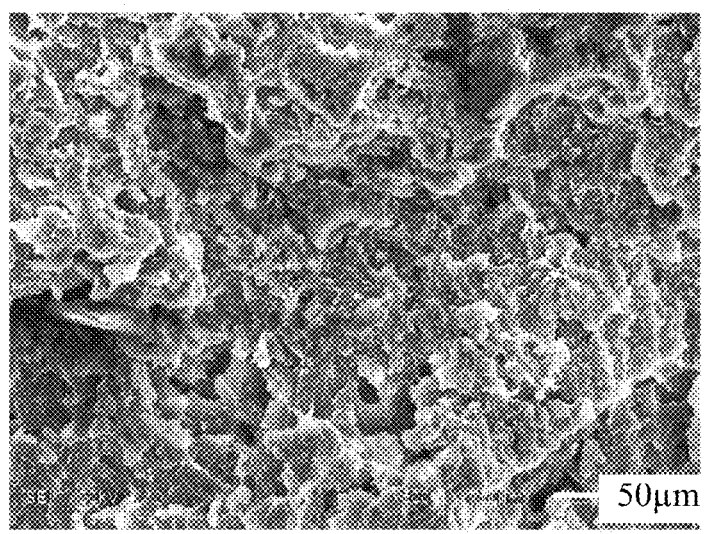
FIG. 8 illustrates a macroscopic fracture cross-sectional view of the solid self-lubricating material with high temperature resistance in Embodiment 3 of the present invention.
Figure 9:
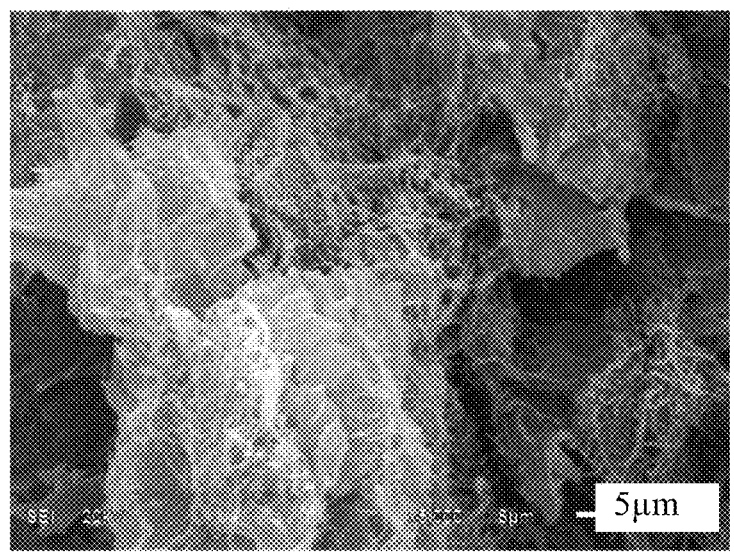
FIG. 9 illustrates a cross-sectional view of the high-temperature resistant solid self-lubricating material in Embodiment 2 of the present invention.
Figure 10:
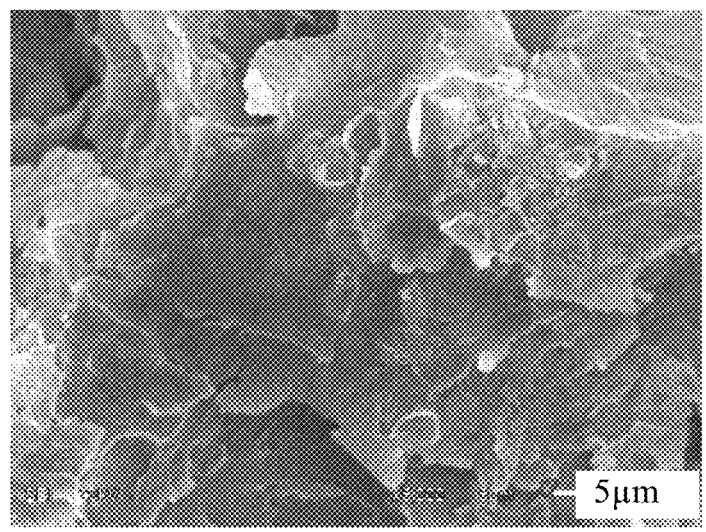
FIG. 10 illustrates a cross-sectional view of the high-temperature resistant solid self-lubricating material in Embodiment 3 of the present invention.

Different from melt processing, the preparation method provided by this invention is based on the characteristics of solid-like molding process, there was a limited time span to control processing temperature. When the polymer was in a solid-like high elastic state, it was an optimal processing temperature, if temperature was too low, it could lead to insufficient free volume that could limit the movement of molecular segments, thus directly affecting the adhesion between polymer particles, if temperature was too high, it not only wasted materials, but caused oxidation and discoloration of finished products. It can be seen from the above table that the glass transition temperature of the composite self-lubricating material drifted due to the addition of nano-lubricating filler. If the composite self-lubricating material was produced according to the production process of pure polyimide, the mechanical properties and tribological properties would decrease, especially the wear resistance would decrease exponentially. As shown in FIG. 6, the fracture morphology of Embodiment 1 showed good plasticizing morphology, and typical brittle fracture occurred after tensile stress. After adding carbon nanotubes, if the molding process was unchanged, a large number of hole manufacturing defects were formed on the fracture surface of Embodiment 2 (FIG. 7). As shown in FIG. 9, there is a serious agglomeration phenomenon in the local position of carbon nanotubes when they were magnified by 5000 times, which was because there was not enough thermal energy to soften the polymer particles, thus resulting in the existence of barriers for nano-fillers to enter the polymer matrix. Only when the processing temperature was increased according to the drift value of glass transition temperature, the movement amplitude of molecular segments becomes significant, and the thermal energy at this time can cross the barrier of translational and rotational movement of polymer molecules. Therefore, as shown in FIGS. 8 and 10, in Embodiment 3, there were no more void defects and agglomeration phenomena. Therefore, the solid like molding process should be adjusted based on its glass transition temperature drift value for the preparation of composite material modified by nano-lubricating filler.

The above embodiments are only used to illustrate the present invention, but not to limit it. Although the invention has been described in detail with reference to the embodiments, it should be understood by those skilled in the art that various combinations, modifications or equivalent substitutions of the technical solutions of the invention will not depart from the spirit and scope of the technical solutions of the invention, and should be covered by the claims of the invention.

What is claimed is:

1. A preparation method of solid self-lubricating material with high temperature resistance, including preparation steps as follows:
   step 1, mixing a polymer matrix resin and a nano lubricating filler to compose uniform raw material powders;
   step 2, placing the raw material powders in a cavity of hot-press die, gradually increasing a temperature to a first preloading temperature under a first preloading pressure;
   step 3, keeping the temperature for 90-120 minutes (min) at the first preloading temperature, and at the same time, controlling a hot pressing pressure to a second preloading pressure;
   step 4, controlling the hot pressing pressure at a third preloading pressure, and gradually increasing the temperature to a solid-phase molding temperature of the solid self-lubricating material; wherein the solid-phase molding temperature of the solid self-lubricating material is 15-20° C. higher than a glass transition temperature of the solid self-lubricating material, and the glass transition temperature of the solid self-lubricating material is 5-30° C. higher than a glass transition temperature of the polymer matrix resin resulting from a glass transition temperature drift caused by the nano lubricating filler;
   step 5, carrying out heat preservation for 60-180 min under a molding pressure for solid-phase molding after the temperature reaches the solid-phase molding temperature of the solid self-lubricating material, wherein the molding pressure is greater than the third preloading pressure, the third preloading pressure is greater than the second preloading pressure, and the second preloading pressure is greater than the first preloading pressure;
   step 6, gradually reducing the temperature to the first preloading temperature after the solid-phase molding is completed, next, removing the molding pressure, finally, obtaining the solid self-lubricating material with high temperature resistance of 200-280° C. by naturally cooling to normal temperature and demoulding.

2. The preparation method of solid self-lubricating material as claimed in claim 1, wherein the molding parameters are as follows:
   in step 2, the first preloading pressure is 8-10 MPa, the first preloading temperature is 240-260° C., and a heating rate is 2-5° C./min;
   in step 3, the second preloading pressure is 13-15 MPa;
   in step 4, the third preloading pressure is 25-35 MPa, and a heating rate is 1-3° C./min;
   in step 5, the molding pressure is 35-45 MPa; and
   in step 6, a cooling rate is 1-2° C./min.

3. The preparation method of solid self-lubricating material as claimed in claim 1, wherein in step 1, a weight ratio of the polymer matrix resin to the nano lubricating filler is 100:(1-10) in the raw material powders.

4. The preparation method of solid self-lubricating material as claimed in claim 1, wherein in step 1, the polymer matrix resin is a polyimide block copolymer with a glass transition temperature of 300-360° C. and an average particle size of 10 μm.

5. The preparation method of solid self-lubricating material as claimed in claim 1, wherein at least one dimension of the nano lubricating filler is less than 100 nm.

6. The preparation method of solid self-lubricating material as claimed in claim 1, wherein the nano lubricating filler is an inorganic nano filler or an organic graft modified inorganic nano filler.

7. The preparation method of solid self-lubricating material as claimed in claim 6, wherein the inorganic nano filler is any one or more of graphene, carbon nanotubes, fullerenes, nano graphene and nano molybdenum disulfide.

8. The preparation method of solid self-lubricating material as claimed in claim 4, wherein in step 1, the polyimide block copolymer is prepared by copolymerization of polyimide segment I and polyimide segment II; the polyimide segment I is obtained by copolymerization of pyromellitic dianhydride and diaminodiphenyl ether and end-capping with diamine, the polyimide segment II is obtained by copolymerization of benzophenone tetracarboxylic dianhydride and diphenylmethane diisocyanate and end-capping with dianhydride.

9. The preparation method of solid self-lubricating material as claimed in claim 8, wherein there are two mixing modes of the polyimide matrix resin and the nano lubricating filler, described as follows:
   a first mixing mode, introducing the nano lubricating filler into a reaction system, after the polyimide segment I reacts with the polyimide segment II to generate a polyamic acid, but before imidization;
   a second mixing mode, carrying out copolymerization of polyimide segment I and polyimide segment II to obtain polyimide powders; applying an ultrasonic dispersion-ball milling collaborative mixing process to mix the polyimide powders, the nano lubricating filler and a solvent; carrying out ultrasonic dispersion at room temperature for 60-120 min; using heating reflux extraction to obtain a blend, using a planetary ball mill to blend the blend for 100-140 min, then drying the blend in an oven at 110-130° C. for 1-3 h to remove the residual volatile matter, finally, obtaining the raw material powders.

10. The preparation method of solid self-lubricating material as claimed in claim 8, wherein a preparation method of the polyimide block copolymer is described in the steps as follows:

step 1.1, preparation of the polyimide segment II: placing benzophenone tetracarboxylic dianhydride and N-methylpyrrolidone in a three-necked flask equipped with a stirring and condensing device under the protection of nitrogen atmosphere, and heating the flask until the solid reactants are completely dissolved; next, adding 1,4-diazabicyclo [2.2.2] octane first, then adding diphenylmethane diisocyanate in batches for copolymerization, discharging $CO_2$ generated during the polymerization through a condenser, finally, obtaining a BTDA-MDI segment copolymer solution end-capping with dianhydride, and cooling it for later use;

step 1.2, preparation of the polyimide segment I: dissolving diaminodiphenyl ether in N-methylpyrrolidone, controlling a temperature below 18-22° C., and then adding pyromellitic dianhydride in batches to obtain a PMDA-ODA segment copolymer solution end-capping with diamine;

step 1.3, adding the cooled BTDA-MDI segment copolymer solution to the PMDA-ODA segment copolymer solution at a constant speed, and keeping the reaction temperature below 18-22° C. for block copolymerization to obtain the polyimide block copolymer.

11. The preparation method of solid self-lubricating material as claimed in claim 9, wherein the solvent is at least one of ethanol and acetone.

12. The preparation method of solid self-lubricating material as claimed in claim 10, wherein the step 1.3 comprises: after the polyimide block copolymer is obtained, carrying out spray drying to obtain polyimide block copolymer powders for hot pressing in the cavity of hot-press die.

* * * * *